(12) United States Patent
Ishizuka

(10) Patent No.: US 6,600,153 B1
(45) Date of Patent: Jul. 29, 2003

(54) DUSTPROOF MECHANISM

(76) Inventor: Akira Ishizuka, 35-24, Idoki 2-Chome, Ageo-shi, Saitama (JP)

(*) Notice: Subject to any disclaimer, the term of this patent is extended or adjusted under 35 U.S.C. 154(b) by 0 days.

(21) Appl. No.: 09/448,469

(22) Filed: Nov. 24, 1999

(30) Foreign Application Priority Data

Nov. 27, 1998 (JP) ............................................ 10-336621

(51) Int. Cl.$^7$ ................................................. H01J 5/02
(52) U.S. Cl. ..................................... 250/239; 250/222.2
(58) Field of Search ........................... 250/222.1, 222.2, 250/223 R, 221; 356/335–343

(56) References Cited

U.S. PATENT DOCUMENTS 3,361,030 A * 1/1968 Goldberg .................... 356/338
5,650,609 A * 7/1997 Mertins et al. ............ 250/222.2
6,064,056 A * 5/2000 Doak ........................ 250/223 R

* cited by examiner

Primary Examiner—Que T. Le
Assistant Examiner—Thanh X. Luu
(74) Attorney, Agent, or Firm—Liniak, Berenato and White

(57) ABSTRACT

The present invention concerns a dustproof mechanism for a detecting means comprising comprises a detecting position, through which substances to be detected are passed at a prescribed position of a detecting optical path, which is formed on one side of the detecting position. The dustproof mechanism provides at least two air chambers between the detecting portion and the detecting position in a manner that these air chambers are perforated through the optical path to make open holes.

10 Claims, 7 Drawing Sheets

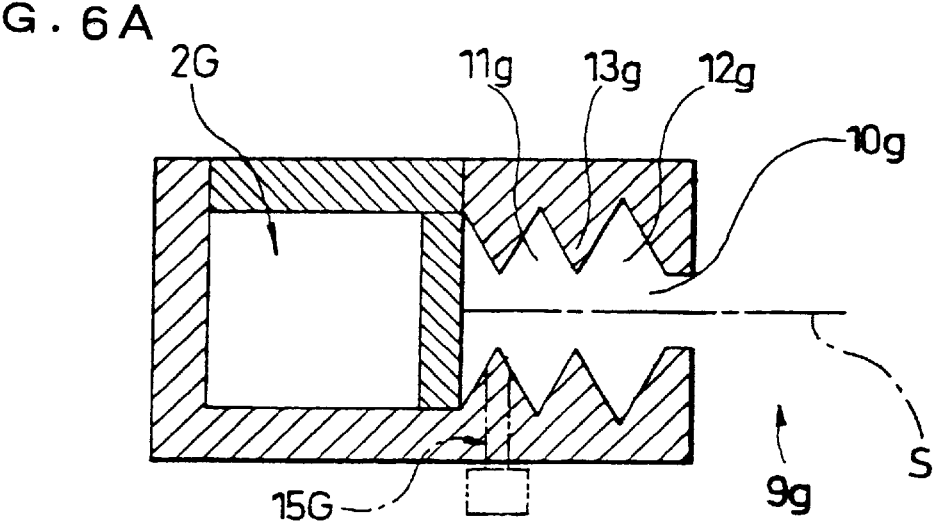
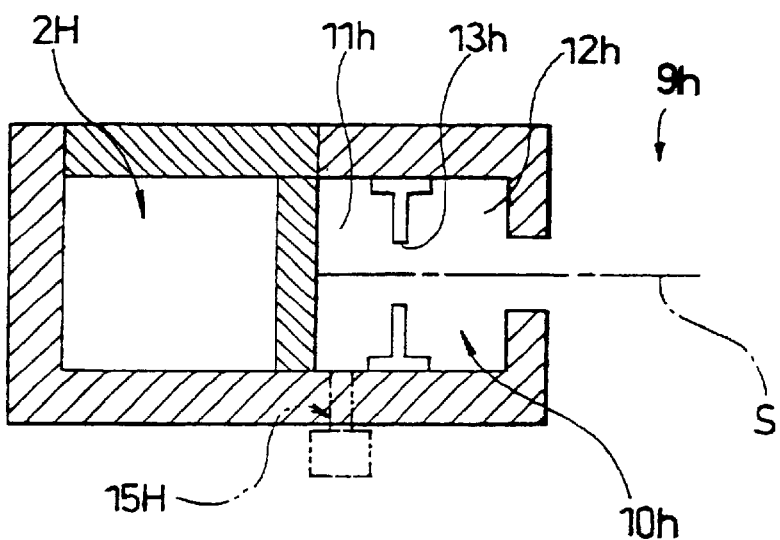
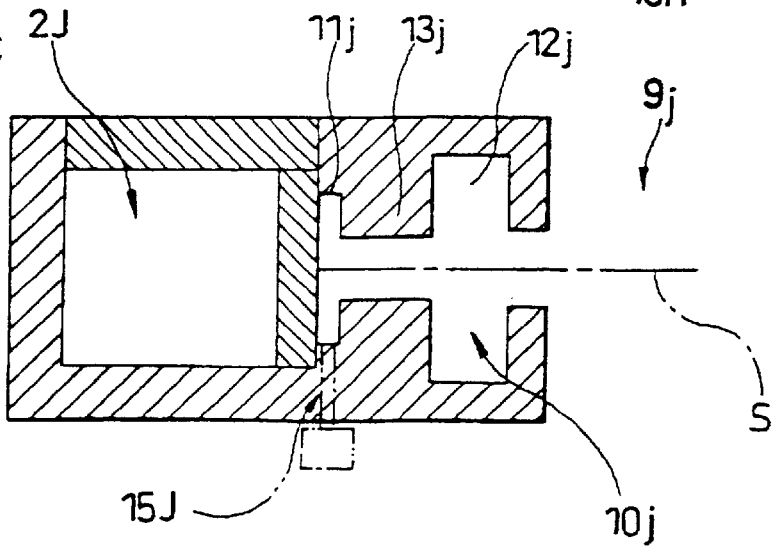

F I G. 7A
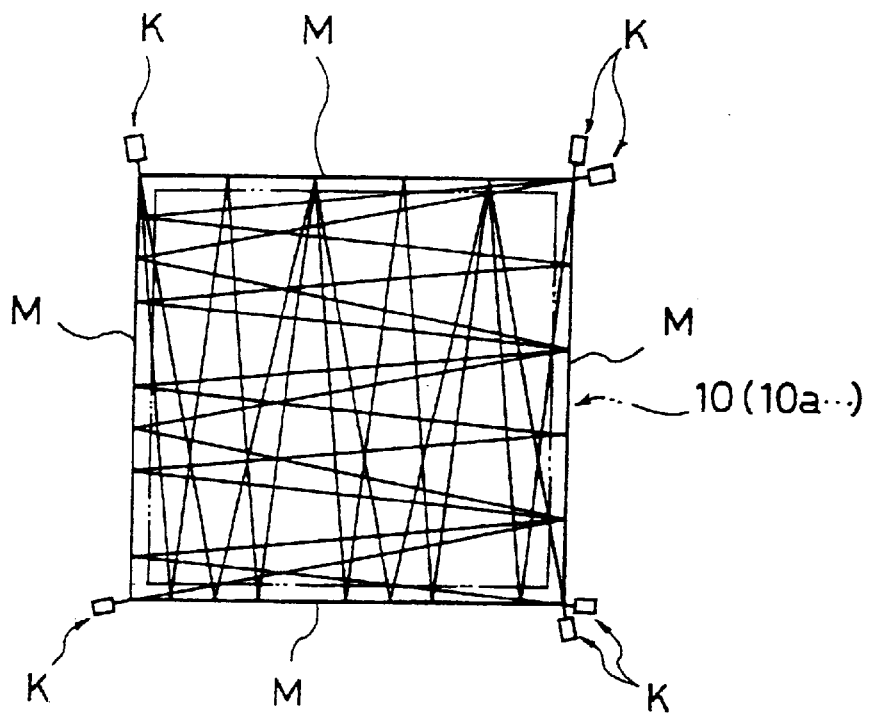
F I G. 7B
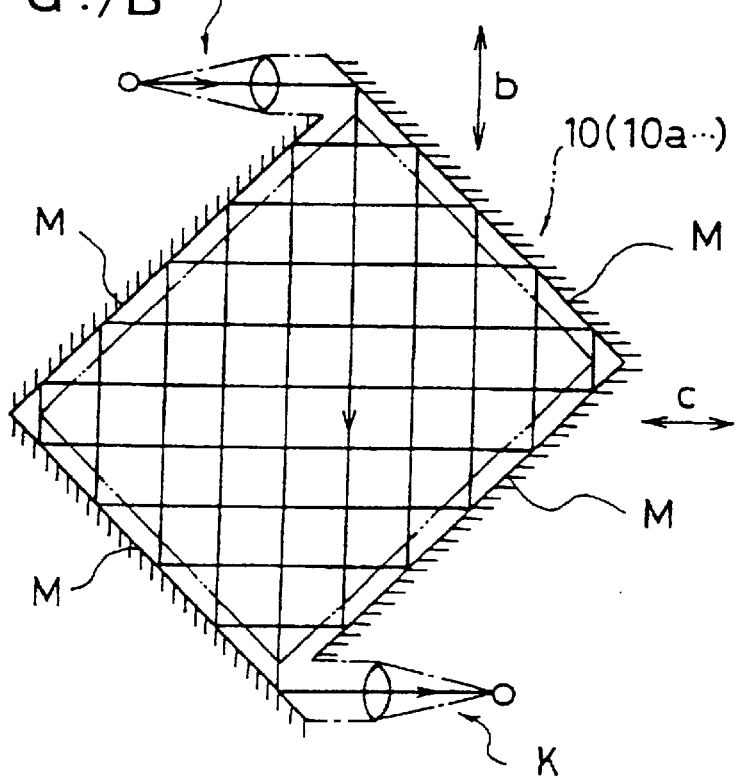

DUSTPROOF MECHANISM

FIELD OF THE INVENTION

The present invention relates to a dustproof mechanism for maintaining the detecting accuracy of the detecting means for detecting substances to be detected.

BACKGROUND OF THE INVENTION

In conventional mechanisms, many detecting means for detecting a number, shape, length, widths of substances to be detected (e.g., tablets, metal parts such as bolts and nuts, which are produced in a large amount at one process, semiconductor elements such as emitting diodes, and plastic parts) has been proposed.

For example, in the case of the detecting means for counting a number of tables which are substances to be detected, the detecting means is configured that tables stored in a hopper for counting are gradually transferred from an outlet of the hopper, and a light detecting sensor, which is a detecting means, is provided at a position of the outlet. The transferred tablets are counted by passing the tablets through a detecting light path placed between a light transmitting portion and a light receiving portion of the light detecting sensor.

In some cases, the detecting means utilizes a light detecting sensor as a so-called image sensor, and a construction of light permeating type that the light transmitting portion and the light receiving portion are placed opposite each other and a construction of reflecting type that the light transmitting portion and the light receiving portion are placed on the same side have been known.

Also, an apparatus for counting a large number of substances to be detected at a high speed in a precision manner in which the substances to be detected are aligned by a centrifugal force or vibration possesses a detecting means at the position where the substances to be detected are transferred. At the present situation, the light detecting sensor has been utilized as the detecting means for such an apparatus.

However, the conventional detecting means has the following problems:

(1) In the detecting means, during the course of passing the substances to be detected through the detecting position, dusts or proof inherent to the substance to be detected themselves, caused by the rusting the substances to be detected with each other when they are stored or arranged, or rusting the substances to be detected by contact with the container to be stored, such as powders in the case of foods or tablets, plastic powders in the case of plastic products, metal dusts in the case of metal parts, or vaporized oils caused from the oils adhered onto the metal parts, are transferred to the detecting position together with the substances to be detected, and the detecting position is filled with such dusts etc. Consequently, the powders or vaporized oils are adhered to the light transmitting portion, light receiving portion or reflecting mirror of the detecting means to decrease the detecting accuracy of the detecting means.

(2) Since the detecting accuracy of the detecting means is decreased when the detecting means is stained by adhering powders etc. onto the detecting portion (light transmitting portion, light receiving portion and reflecting mirror), cleaning must be carried out after several operations of the detecting means. For this reason, the detecting operation such as counting must be stopped to constantly carry out maintenance within a short running.

(3) Particularly, in the case of the detecting means for use in high performance counting apparatus, since a larger amount of dusts etc. occurs because the apparatus counts a large amount of the substances to be detected at a high speed, the decrease in the accuracy is remarkable due to the adhesion of powders onto the light transmitting portion, light receiving portion or the reflecting mirror. The adhered powders, etc. onto the detecting portion must be cleaned every constant period of time.

(4) In some detecting means, the side walls are formed on the detecting position. When the powders etc. are adhered onto the side walls, error information is sometimes transferred to the light receiving portion. Consequently, the construction of the detecting position must be considered in order to enhance the detecting accuracy.

SUMMARY OF THE INVENTION

The present invention has been proposed in order to solve the problems associated with the prior art. An object of the present invention is to provide a dustproof mechanism (1) which can minimize the adhesion of powders onto the detecting portion of the detecting means, (2) which can minimize the cleaning of the detecting portion, (3) which can be installed to the resent existing apparatus, (4) which has a simple structure that only adequate information can be transferred to the detecting position to the light receiving portion, and (5) which can also minimize the adhesion of powders even in the case of high performance counting apparatus.

A dustproof mechanism of the present invention is for the purpose of dust proofing a detecting means comprising a detecting position, through which substances to be detected are passed at a prescribed position of a detecting optical path, which is formed on one side of the detecting position. In the dustproof mechanism of the present invention, at least two air chambers being provided between the detecting portion and the detecting position in a manner that these air chambers are perforated through the optical path to make open holes.

In a preferred embodiment of the present invention the dustproof mechanism also provides detecting portions at opposite sides of the detecting position.

In another preferred embodiment of the present invention, the detecting portion may be composed of a light emitting portion and a light receiving portion, or may be composed of a light emitting portion, a light receiving portion and a reflecting mirror.

In a preferred embodiment of the dustproof mechanism, a gas supply means is connected to the air chamber provided at the side far from the position of the detecting position, so that a gas is supplied from the air chamber connected to the gas supply means toward the side of the detecting position.

In another preferred embodiment of the dustproof mechanism, the air chambers are formed so that the capacity becomes gradually smaller toward the position far from the detecting position.

In still another preferred embodiment of the dustproof mechanism, the two or more air chambers are provided by dividing each of the air chambers by the dividing plate in a manner of making open holes on the detecting optical path.

Also, it is possible for the dustproof mechanism according to the present invention to provide a sidewall formed along the optical path in such a manner that a slant angle is provided which does not reflect a light from the light emitting part on the light reviving part.

BRIEF DESCRIPTION OF THE DRAWINGS

FIG. 6A, FIG. 6B, and FIG. 6C are cross-sectional views showing eighth to tenth embodiments of the dustproof mechanism according to the present invention; and FIG. 7A and FIG. 7B are cross-sectional views each showing another embodiment of the dustproof mechanism according to the present invention.

DESCRIPTION OF PREFERRED EMBODIMENTS

Figure 1A:
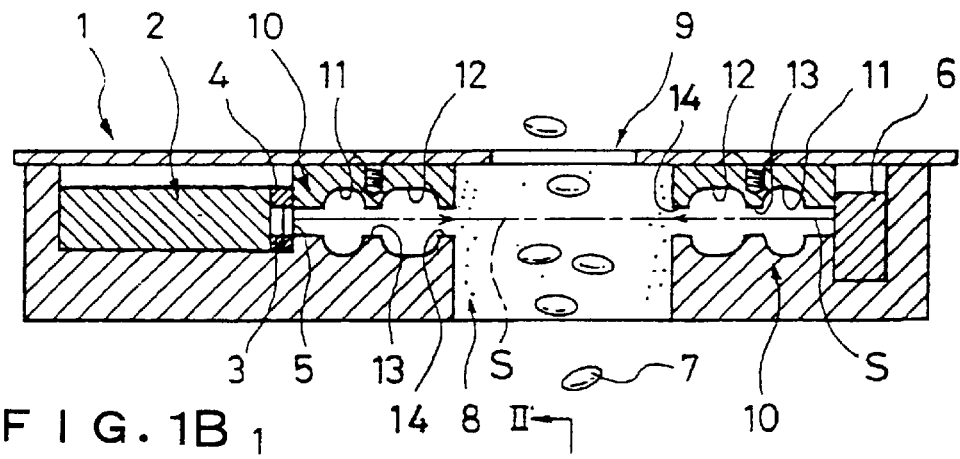
FIG. 1A, FIG. 1B, and FIG. 1C are cross-sectional views each showing a first embodiment of the dustproof mechanism according to the present invention.
Figure 1B:
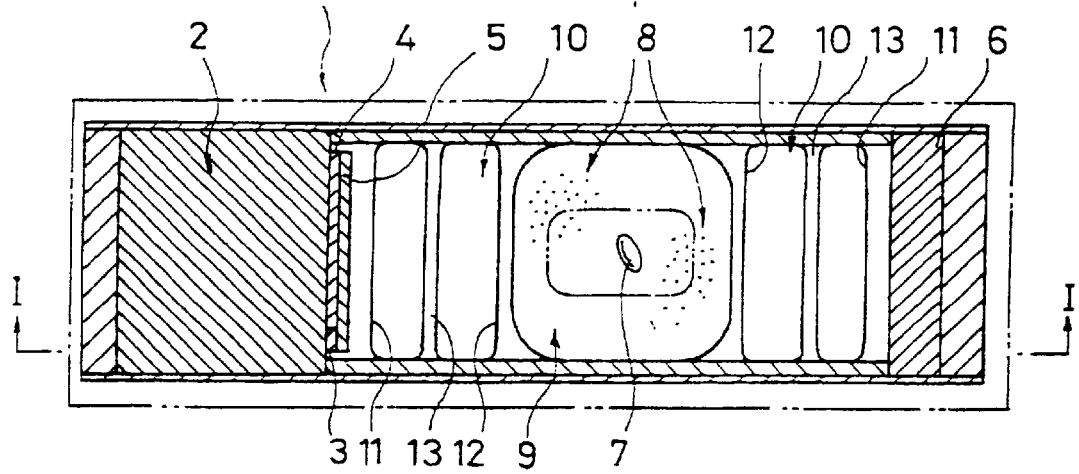

In the embodiment as shown in FIG. 1A and FIG. 1B, a detecting means 1 utilizes a light-detecting sensor in a detecting portion 2, and a light transmitting portion 3 and a light receiving portion 4, both making up the detecting portion 2, a reflecting mirror 5 provided on one side, and a reflecting mirror 6 provided on the side opposite the detecting portion 2. Also, a detecting light path S is formed between the light-transmitting portion 3, the light receiving portion 4, as well as the reflecting mirror 5 and the reflecting mirror 6. A detecting position 9 is set at a prescribed position of the detecting light path S, and when substances 7 to be detected passes through the detecting position, they are counted (detected) by means of the light receiving portion 4. Further, dustproof mechanisms 10 and 11 are provided along the detecting light path S constructed between the detecting portion 2 and the reflecting mirror 5 on both sides of the detecting light path S, respectively.

The dustproof mechanism 10 penetrates the detecting light path S to form an open hole and it forms a first air chamber 12 and a second air chamber 11 via dividing portions 13 from the detecting position 9 toward the detecting portion 2 and the reflecting mirror 6. The first air chamber 12 placed near the detecting position 9 is constructed so as to have a larger capacity than that of the second air chamber 11 placed far from the detecting position 9. Both air chambers 11 and 12 are closed except for the open holes 14 of the detecting light path S. Against the downstream air-flow of dropping the substances 7 to be detected, the atmospheric pressures of the first and the second air chambers 11 and 12 are higher than the space of the detecting position 9. Further, the atmospheric pressure of the space of the second air chamber 11 is higher than that of the first air chamber 12. The interior of both air chambers 11 and 12 is preferably curved surface, and may be polygonal, oval, or circular shape.

Figure 1C:
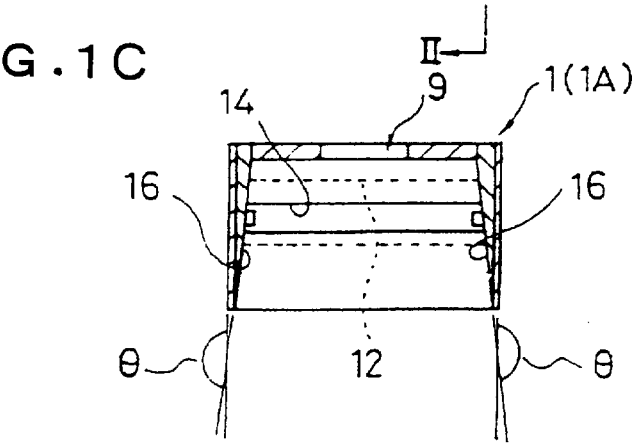

At the detecting position 9, a plane light path network (detecting light path S) is formed on a space which opens the light irradiated from the right transmitting portion 3 by reflecting it between the reflecting mirrors 5 and 6. When the substances 7 to be detected, such as tablets, pass through the plane light path network, the tables etc. can be counted or detected. As shown in FIG. 1C, when side walls 16 and 16 perpendicular to the reflecting mirrors 5 and 6 are formed as side wall having right angle in the case of forming the detecting light path S, the light receiving portion 4 should have an effect of the reflecting light of these side walls. For this reason, these side walls 16 and 16 are formed along the detecting light path S so as to have a constant angle θ. The angle θ has an angle such that the side walls 16 and 16 are extended downward. Consequently, even if the powder 8, etc. drop, they do not remain on these side walls, and even if the powder 8, etc. are adhered onto the side walls 16 and 16, the detecting accuracy is never decreased.

The function of counting the substance 7 to be detected by the detecting means 1 will now be described. In the following description, the tablets are exemplified as the substances to be detected. When the substances 7 to be detected drop and pass through the detecting position 9, they are detected and counted at the detecting light path S formed between the detecting portion 2 of the detecting means 1 and the reflecting mirror 6.

When the substances 7 to be detected are tablets, the powders 8 are brought about due to rusting during the course of transferring the tablet to the detecting position 9. A large number of the powders 8 exist within the space of the detecting position 9 with the dropping of the tablets. At this time, since the dustproof mechanism 10 and 10 are provided on both sides of the detecting portion 2 and the reflecting mirror 6, the powders drops to the direction as described hereinbefore. To be specific, the powders 8 will move together with air flowing to the direction of dropping the powders 9 and will enter the interior of the detecting light path S from the open hole 14. However, since the atmospheric pressure of the first air chamber 12 is higher than that of the space of the detecting position 9, and further the atmospheric pressure of the second air chamber 11 is higher than that of the first air chamber 12, the powders 8 never enter the first air chamber 12 due to the air-flow generated. Of course, the powders 8 cannot enter the second air chamber 11. Consequently, the powders 8 drop downward together with the tablets.

While in the embodiment as shown in FIG. 1A and FIG. 1B, the size of the first air chamber 12 is constructed so as to be different from the size of the second air chamber 11, they may have the same size. In this case, the incorporation of the powders into the air chambers 11 and 12 can be minimized. Also, while two air chambers, i.e., the first and the second air chambers 11 and 12 are provided in this embodiment, the number of the air chambers is not restricted and, thus, three or more air chambers may be provided. If the substances to be detected are reducing materials which are reactive to the oxidizing substances, an inert gas such as nitrogen or carbon dioxide may be supplied instead of air.

Consequently, in the case where the substances 7 to be detected (counted in the figure), when the operation is carried out with the actuation of the air supply means 15, the air-flow from the sides of the second air chambers 11a and 11a far from the detecting position 9 toward the detecting position 9 occurs and, thus, the powders 9 generated from the substance 7 to be detected never enter the detecting portion 2 nor the reflecting mirror 6.

As shown in FIG. 1C, the side wall 16 at the position of the detecting position 9 of the detecting means 1A has a prescribed angle θ along the detecting light path S and, thus, adequate detection (counting in the case of this figure) of the substances 7 to be detected can be made. In this figure, two air chambers 12a and 11a having the same capacity are provided, however, it should be noted that the number of the air chambers, their positions, and their capacity are not restricted as long as the object of the present invention can be attained. For example, three air chambers may be provided, and the air chambers have a larger capacity as they are far from the detecting position.

Figure 2A:
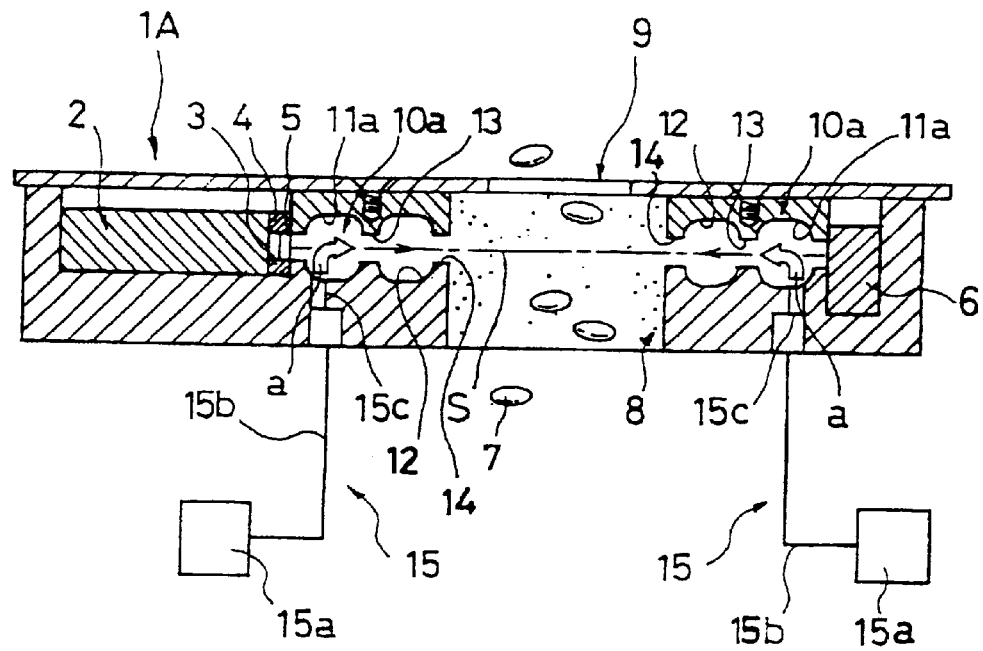
FIG. 2A and FIG. 2B are cross-sectional views each showing a second embodiment of the dustproof mechanism according to the present invention.
Figure 2B:
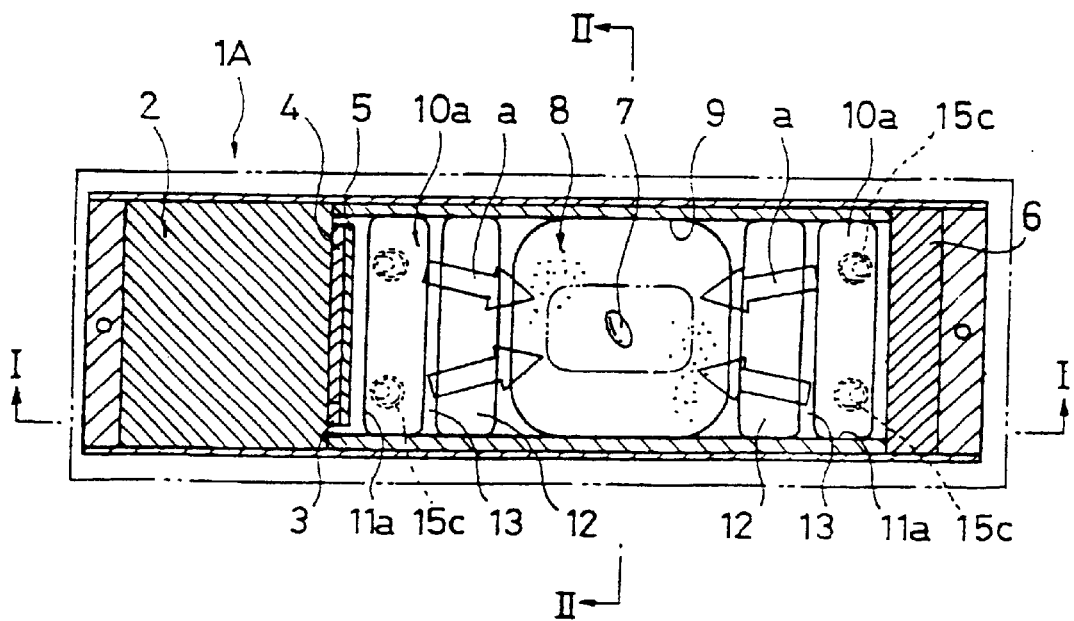
Figure 3A:
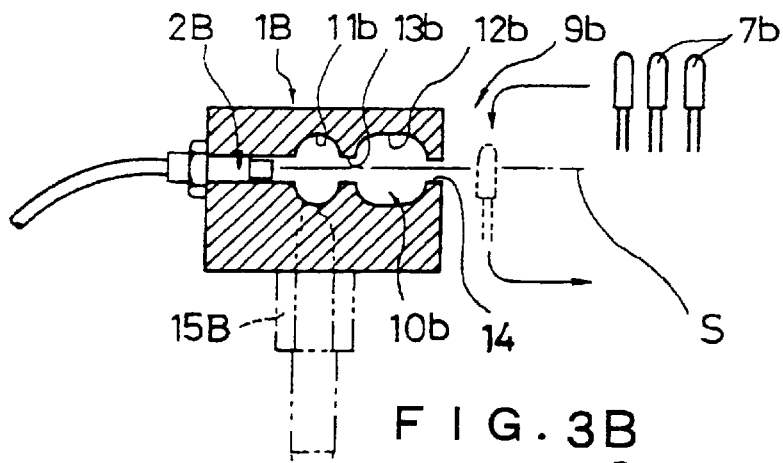
FIG. 3A, FIG. 3B, and FIG. 3C are cross-sectional views showing third to fifth embodiments of the dustproof mechanism according to the present invention.
Figure 3B:
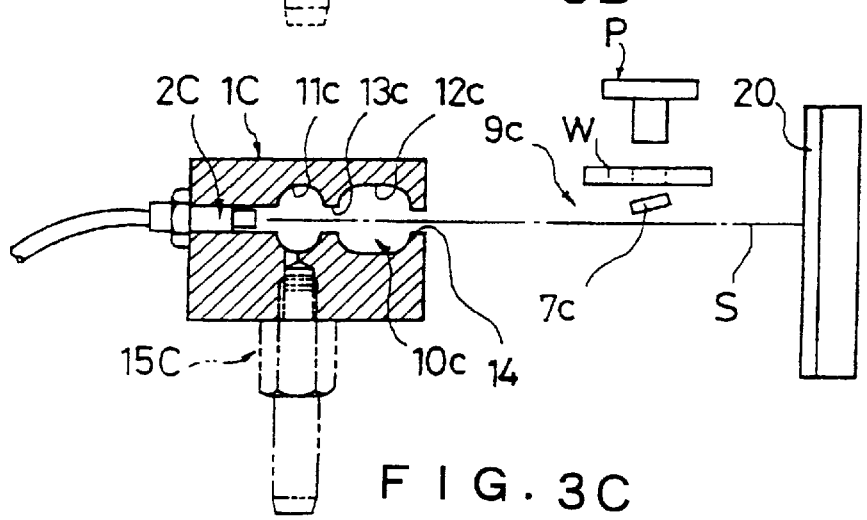

Third to fifth embodiments of the present invention will now be described by referring to FIG. 3A and FIG. 3B. Since the dustproof functions by the dustproof mechanisms 10b, 10c, and 10d are the same as those described in FIG. 1 and FIG. 2, they are omitted. Although deferent numbers are used in the dustproof mechanisms because of the different construction of the detecting means, these dustproof mechanisms shown in the figures have the same construction.

The dustproof mechanism 10b of a detecting means 1B according to the third embodiment of the present invention will now be described on the basis of FIG. 3A. The detecting means 1B has a detecting portion 2B (comprising a light transmitting portion and a light receiving portion) at one end thereof and a dustproof mechanism 10b having a closed construction except for an open hole 14 along a detecting light path S at the front side of the detecting portion 2B. In the dustproof mechanism 10b, a detecting position 9b is set at a portion near the open hole 14. A first air chamber 12b is formed at the side of the detecting position 9b, and a second air chamber 12b is formed on the first air chamber 11b via a dividing portion 13b. The second air chamber 11b has a capacity larger than that of the first air chamber 12b.

As shown by an ideal line, an air supply means 15B may be connected to the second air chamber 12b far from the detecting position 9b to cause a gas flowing toward the detecting position 9b.

When the substances 7 to be detected block the detecting light path S, the light reflected from the substances 7b to be detected is received by the light receiving portion of the detecting portion 2b, to count the number of the substances 7 to be detected. The substances 7 to be detected may be, for example, semiconductor elements such as resistors having lead lines extending from their body, capacitors having a large number of lines from one side or light emitting diodes. When the substances 7 to be detected are counted, powders 8 generated from resins or other materials are carried to the side of the detecting position 9b together with flowing air, but due to the provision of the dustproof mechanism 10b, they cannot enter the side of the detecting portion 2B.

The dustproof mechanism 10c of a detecting means 1C according to the fourth embodiment of the present invention will now be described on the basis of FIG. 3B. As shown in FIG. 3B, the detecting portion 2C has a light emitting portion and a light receiving portion and is constructed that a light irradiated is reflected by a reflecting mirror 20 and substances 7c to be detected are detected by the received light. A dustproof mechanism 10c has a closed form except for an open hole 14 along a detecting light path S at the front side of the detecting portion 2B. In the dustproof mechanism 10b, a detecting position 9b is set at a portion near the open hole. A first air chamber 12c is formed at the side of the detecting position 9c, and a second air chamber 12c is continuously formed on the first air chamber 12c via a dividing portion 13c. The second air chamber 11c has a capacity larger than that of the first air chamber 12c. An air supply means 15C may optionally be connected to the second air chamber 12c far from the detecting position 9c to cause a gas flowing toward the detecting position 9c.

Consequently, when the substances 7c to be detected pass through the detecting light path S at the detecting position 9c, the light passed at this position is blocked and is not reflected to the detecting portion 2c (light receiving portion), so that the substances 7c to be detected are detected (counted). The detecting means 1C is to detect (count) substance 7c in which belt works W are pressed by a pressing mechanism P and punched out. In the case where the detecting means 1C is provided at a position of a process line as described above, due to the provision of the dustproof mechanism 10c, even in an environment where powders generated due to the pressing are flown, the entering of the powers etc. to the side of the detecting portion 2C can be minimized.

Figure 3C:
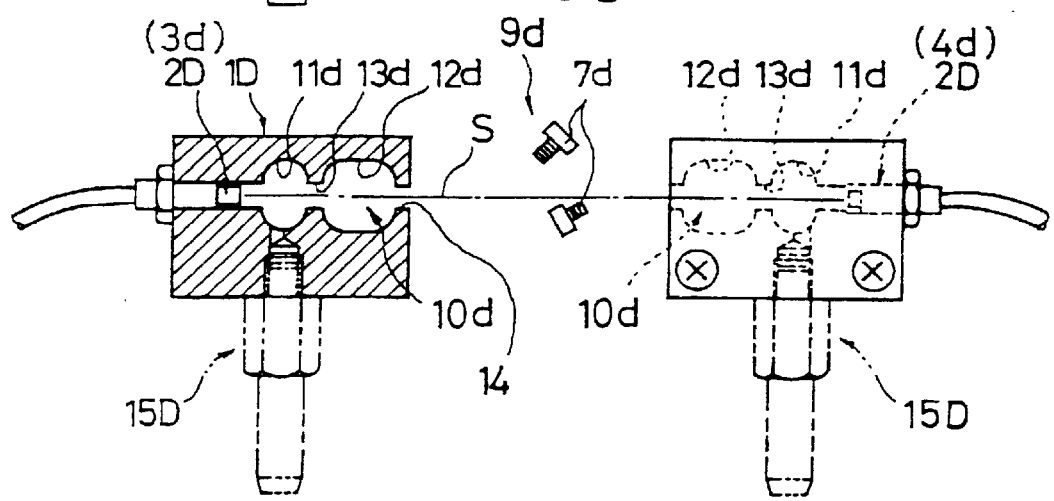

The dustproof mechanism 10d of a detecting means 1D according to the fifth embodiment of the present invention will now be described on the basis of FIG. 3C. As shown in FIG. 3C, the detecting means 1D is composed of detecting portions 2D and 2D (light emitting portion 3d and light receiving portion 4d) provided opposite each other (it being possible to use a reflecting mirror), and is constructed that substance 7d to be detected pass through a detecting light path S scanning between the detecting portions 2D and 2D to be detected (counted). The detecting means 1D has the dustproof mechanisms 10d and 10d on the detecting portion 2D and 2D. The each dustproof mechanism 10d has an open hole 14 to make up a detecting light path S, and a first air chamber 12d is placed at the side of the open hole 14, and a second air chamber 12d is formed on the first air chamber 11d via a dividing portion 13d. The second air chamber 11d has a capacity larger than that of the first air chamber 12d. An air supply means 15D may optionally be connected to the second air chamber 11d far from the detecting position 9d to cause a gas flowing toward the detecting position 9d.

Consequently, when the substances 7d to be detected pass through the detecting light path S at the detecting position 9d, the light passed at this position is blocked and is not reflected to the detecting portion 2d (light receiving portion 4d), so that the substances 7d to be detected are detected (counted). Due to the provision of the dustproof mechanisms 10d and 10d in the detecting positions 9d and 9d, for example in the case where the substances 7d to be detected are metal parts such as metal-made screws, even if the dusts and powders generated due to the rusting of these metal parts, and vapor generated from oil adhered are to flow into the detecting position, since the difference in atmospheric pressure is generated between the air chambers 11d and 12d, the incorporation and adhesion of these dusts etc. can be prevented.

Particularly, in the case where the detecting portions 2B, 2C and 2D (light transmitting portion and light receiving portion) are made of optical fibers, etc., or where the dustproof mechanisms 10b, 10c, and 10d are for the purpose of present detecting portion, they can be advantageously used. The dustproof mechanisms 10b, 10c, and 10d are formed in detachable manner via mounting means such as nuts and thus, they can be mount to the detecting means which as already been set. The air chambers 12b (12c and 12d) and 11b (11c and 12d) may have the same capacity and three or more air chambers can be provided.

Sixth and seventh embodiments of the dustproof mechanism will now be described by referring to FIGS. 4 and 5.

Figure 4:
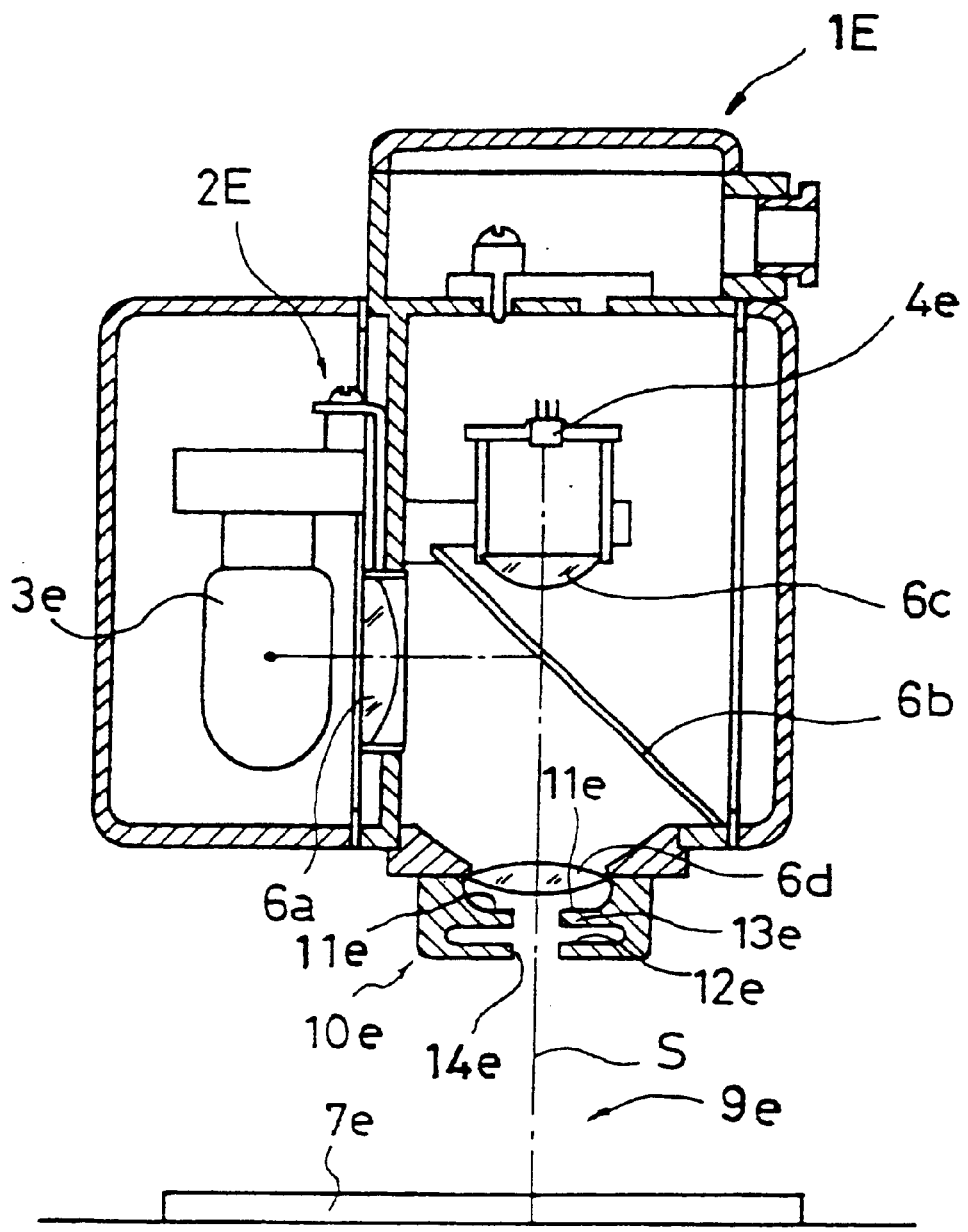
FIG. 4 is a cross-sectional view showing a sixth embodiment of the dustproof mechanism according to the present invention.

As shown in FIG. 4, a detecting means 1E has a lamp light source 3e on a detecting portion 2E as a light emitting portion. The light is irradiated by the lamp light source 3e to substances 7e to be detected via a condenser lens 6a, a half mirror 6b and an object lens 6d. The light reflected from the substances 7e to be detected is focused on a phototransistor 4e via the half mirror 6b and a focus lens 6c to be detected. A dustproof mechanism 10e is provided so as to make up a detecting light path S permeating the object lens 6d.

The dustproof mechanism 10e has an open hole 14e at the detecting position 9e, and a first air chamber 12e is placed at the side of the open hole 14e, and a second air chamber 12e is formed on the first air chamber 11e via a dividing portion 13e. The second air chamber 11e has a capacity larger than that of the first air chamber 12d. For this reason, in the case where there are dusts, etc., generated when the detecting means 1E is moved by a moving means (not shown) or when the substances 7e to be detected are moved to the detecting position 9e, there is a difference in the atmospheric pressure between the air chambers 12e and 11e. For this reason, the dust etc. are never adhered to the object lens 6d.

Due to the provision of two or more (two in FIG. 4) air chambers on the dustproof mechanism 10e, when the air flow is caused at the detecting position 9e, the atmospheric pressure at the side of the first air chamber 12e becomes higher than that of the detecting position 9e, and the atmospheric pressure of the second air chamber 11e becomes higher than that of the first air chamber 12e. This can prevent the incorporation of the dusts etc. into the object lens 6d from the air chambers 12e and 11e. Consequently, the adhesion of dusts etc. to the object lens 6d can be minimized. When an air supply means (see FIG. 2 and FIG. 3) is connected to the second air chamber 1e to cause a gas flowing from the second air chamber 11e to the first air chamber 12e, the dustproof effect can be further enhanced.

Figure 5:
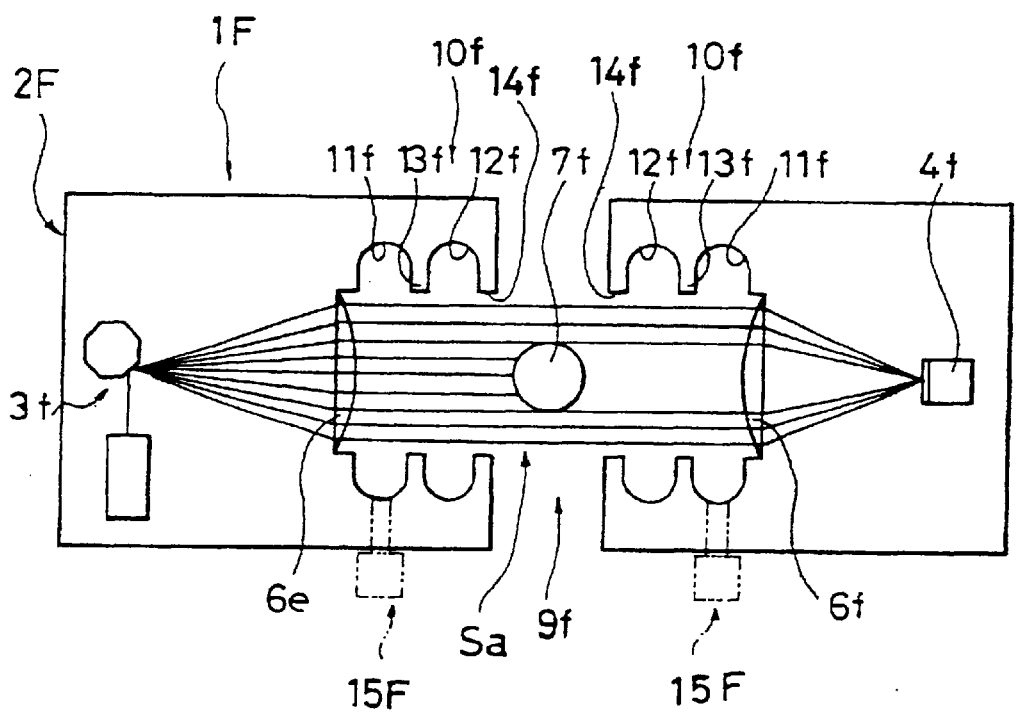
FIG. 5 is a cross-sectional view showing a seventh embodiment of the dustproof mechanism according to the present invention.

As shown in FIG. 5, a detecting means 1F has a scanning detecting portion 2F. The detecting portion 2F is composed of a light transmitting portion 3f comprising a laser generating portion and a rotational mirror and a light receiving portion comprising a light receiving element placed opposite the light transmitting portion. Collimater lenses 6e and 6f are provided on a light scanning path Sa (detecting light path) so that the convex faces thereof are placed in a face to face manner. The light scanning path Sa (detecting light path) is surrounded from the collimater lenses 6e and 6f to make open holes, and first air chambers 12f and 12f and second air chambers 11f and 11f are provided from the detecting position 9f to the collimater lenses 6e and 6f via dividing portions 13f and 13f. As for the first air chamber 12f and the second air chamber 11f may be constructed so that the capacity becomes smaller as far from the detecting position. Also, it is possible to connect air supply means 15F and 15F to the second air chambers 12f and 12f.

For this reason, when the substances 7f to be detected are placed at the detecting position 9f, a diameter or shape of the substances can be detected (determined). When the substances 7f to be detected are detected, even if a large amount of dusts etc. exist due to the installation environment, due to the provision of the dustproof mechanisms 10f and 10f, even if the dusts etc. are to be incorporated from the open holes 14f and 14f into the collimater lenses 6e and 6f by means of air flow, they cannot be incorporated, because an atmospheric pressure of the first air chamber 12f is higher than that of the detecting position, and an atmospheric pressure of the second air chamber 11f is higher than that of the first air chamber 12f. When an air supply means 15F may be connected to the second air chamber 12f far from the detecting position 9b to cause a gas flowing toward the detecting position 9b as shown by an ideal line, the dustproof effect can be further enhanced.

The constructions of the dustproof mechanisms 10 etc., shown in FIGS. 1 to 5 may have constructions according to eighth to tenth embodiments as shown in FIG. 6. To be specific, as shown in FIG. 6A, the dustproof mechanism 10g according to eighth embodiment has a construction that the sectional shapes of the first air chamber 12g and the second air chamber 11g are triangles placed in a face to face manner. By such a construction, dividing portion 13g, which divides the air chambers 12g and 11g advantageously has a minimum lengthwise size along the detecting light path S, because the adhesion of the powders onto a light path formed along the detecting light path, particularly to a portion near the detecting light path S has adversely effects upon the detecting portion 2G. In this embodiment, while the capacity of the first air chamber 12g is larger than that of the second air chamber 11g, it is of course possible for the first and the second air chambers 12g and 11g to have the same capacity. Also, an air supply means 15G may be installed.

In the dustproof mechanism 10h according to a ninth embodiment as shown in FIG. 6B, a dividing plate 13h is separately formed and is mounted to form a first air chamber 12h and a second air chamber 11h. The air chambers 12h and 11h are constructed so that the capacity of the air chambers becomes smaller from the detecting position 2H toward the detecting portion 2H via the dividing plate 13h. It is of course possible for the first and the second air chambers 12h and 11h to have the same capacity. Also, an air supply means 15H may be installed.

In the dustproof mechanism 10j according to a tenth embodiment as shown in FIG. 6C, the capacity of a first air chamber 12j placed at the side of the detecting position 9j is significantly higher than that of a second air chamber 11j placed at the side of the detecting portion 2J. The space between the first air chamber 12j and the second air chamber 11j is constructed so as to have several intervals by a dividing portion 13j. For this reason, there is a larger difference in atmospheric pressure between the air chambers 12j and 11j. Of course, an air supply means 15H may be installed.

In the dustproof mechanism 10 (10a . . .) shown in FIGS. 1 to 6, the open holes 14 (14e . . .) at the side of the detecting position 9 (9a . . .) may be shaped into a long pore, circle pore, depending up the shape of detecting light path S (Sa) of the detecting means 2 etc. With regard to the dividing portion or dividing plate, which divides the air chambers, the position of the open hole made up by the dividing portion or dividing plate may be narrower than the open hole 14 (14e . . .) toward the height direction or width direction. The dustproof mechanisms 10b, 10c, 10d, 10e, and 10f may be constructed so as to be placed on the detecting portions 2B (2C . . .) in a detachable manner.

Also, as shown in FIG. 7A and FIG. 7C, the dustproof mechanisms 10 (10a . . .) may be placed on detecting portions K placed on four sides and reflecting mirrors M. In FIG. 7B, the reflecting mirrors are movable in the directions shown by the arrows b and c. Also, deaeration mechanism (not shown) for powders dropped downward the detecting means may be placed to prevent the incorporation of the powders into storage container for storing the substances to be detected.

In the case where three or more air chambers are provided and an air supply means is provided, the air supply means may be connected to the position most far from the detecting position or may have a construction where gas is supplied from an air chamber placed at the second or third position from the detecting position.

The dustproof mechanism is applicable to any other detecting means such as means for aligning the member, means for reading a code mark, means for selecting a product, or means used as an image sensor. Also, even if the detecting means has a construction different from described above, the dustproof mechanism can be used.

The dustproof mechanism of the present invention has the following outstanding advantages:

(1) The dustproof mechanism of the present invention has a construction where two or more air chambers are placed on one or both sides of the detecting position at the portion between the light transmitting portion, light receiving portion and reflecting mirror, depending upon the construction of the detecting portion. For this reason, even if the powders etc exist together with the substances to be detected on the detection position, due to a difference in atmospheric pressure generated by the air chambers, the powders etc. are never incorporated into the side of the detecting portion. Consequently, the powders etc. do not have any adverse influence upon the detecting accuracy. Further, since the staining of the detecting portion can be minimized, the number of constant maintenances can be decreased.

(2) When the dustproof mechanism of the present invention has an air supply means which forms an air flow from the air chamber far from the detecting position to the side of the detecting position, the powders existing in the detecting position are never incorporated into the air chamber.

(3) When two or more air chambers provided are formed such that the capacity of the air chambers are formed to become smaller from the detecting position to the detecting portion or the reflecting mirror, the great difference in the atmospheric pressure can be produced from one air chamber to another air chamber, making it possible to further enhance the dustproof effect.

(4) When a dividing plate is used as the dividing portion for the formation of the air chambers, the size of the air chambers can be freely adjusted.

The dustproof mechanism of the present invention which can be simply constructed can be installed to a detecting means which has already been existed.

What is claimed is:

1. A dustproof mechanism to control sticking of dust to the minimum in an automatic high-speed counting apparatus comprising:

a detector, which has a reflecting mirror, which reflects an optical light in a reverse direction, a light emitter, which irradiates said optical light towards said reflecting mirror, and a light receiver, which receives the optical light reflected by said reflecting mirror and is provided together with said light emitter;

a dustproof casing, which accommodates said detector and is provided along a detecting optical path, said detecting optical path is a pathway of said optical light;

a detecting position, which is provided at a prescribed position in said dustproof casing, through which substances to be detected pass and intersect said detecting optical path, and a pair of air chambers, which have substantially equivalent capacity and are provided in said dustproof casing so that said detecting position is located therebetween, said pair of air chambers being aligned so that said detecting optical path is adapted to pass through said pair of air chambers, wherein each of said pair of air chambers is defined by at least two adjoining sub-air chambers, and wherein a first sub-air chamber is located adjacent said detecting position and connects with said detecting position via a first opening, and a second sub-air chamber is adjacent said first sub-air chamber opposite said detecting position and connects with said first air chamber via a second opening, said second sub-air chamber having a smaller capacity than said first sub-air chamber.

2. The dustproof mechanism as claimed in claim 1, wherein said sub-air chambers are only connected with said detecting position in a manner that allows air current toward said detecting position when there is negative pressure caused by substances passing through said detecting position.

3. The dustproof mechanism as claimed in claim 1, wherein said pair of air chambers include a first air chamber which is located near said detecting position and connects with said detecting position, and a second air chamber which is adjacent to said first air chamber and has a smaller capacity than said first air chamber and only connects with said first air chamber.

4. The dustproof mechanism as claimed in claim 3, wherein pressure in said second air chamber becomes higher than pressure in said first air chamber when the substances to be detected are passed through said detecting position.

5. The dust proof mechanism as claimed in claim 1, wherein said first opening and said second opening are substantially the same size.

6. The dust proof mechanism as claimed in claim 1, wherein one of said pair of air chambers connects said reflecting mirror with said detecting position, and the other of said pair of air chamber connects both said light irradiator and said light receiver with said detecting position.

7. A dust proof mechanism to control sticking of dust to the minimum in an automatic high-speed counting apparatus comprising:

a detector, which has a reflecting mirror, which reflects an optical light in a reverse direction, a light emitter, which irradiates said optical light towards said reflecting mirror, a light receiver, which receives the optical light reflected by said reflecting mirror and is provided together with said light emitter;

a dustproof casing, which accommodates said detector and is provided along a detecting optical path, said detecting optical path is a pathway of said optical light;

a detecting position, which is provided in a prescribed position in said dust proof casing, and through which substances to be detected pass and intersect said detecting optical path;

a pair of air chambers, which have substantially equivalent capacity and are provided in said dust proof casing so that said detecting position is located therebetween, wherein each of said pair of air chambers has at least two adjoining sub-air chambers, which are aligned along said detecting optical path, and the capacity of said adjoining sub-air chambers becomes progressively smaller toward a position away from said detecting position.

8. The dustproof mechanism as claimed in claim 7, wherein each of said sub-air chambers communicates with adjoining sub-air chamber via an opening, and each of said pair of air chambers communicates with said detecting position via an opening, respectively.

9. The dustproof mechanism as claimed in claim 7, wherein said pair of air chambers includes a first air chamber, which is located near said detecting position and connects with said detecting position via a first opening, and a second air chamber which is adjacent to said first air chamber and has a smaller capacity than said first air chamber and connects with said first air chamber via a second opening.

10. The dustproof mechanism as claimed in claim 9, wherein said first opening and said second opening have substantially the same size.

* * * * *